F. H. ENGSTROM.
TIRE INFLATER AND TESTER.
APPLICATION FILED JULY 3, 1916.
1,198,205.
Patented Sept. 12, 1916.
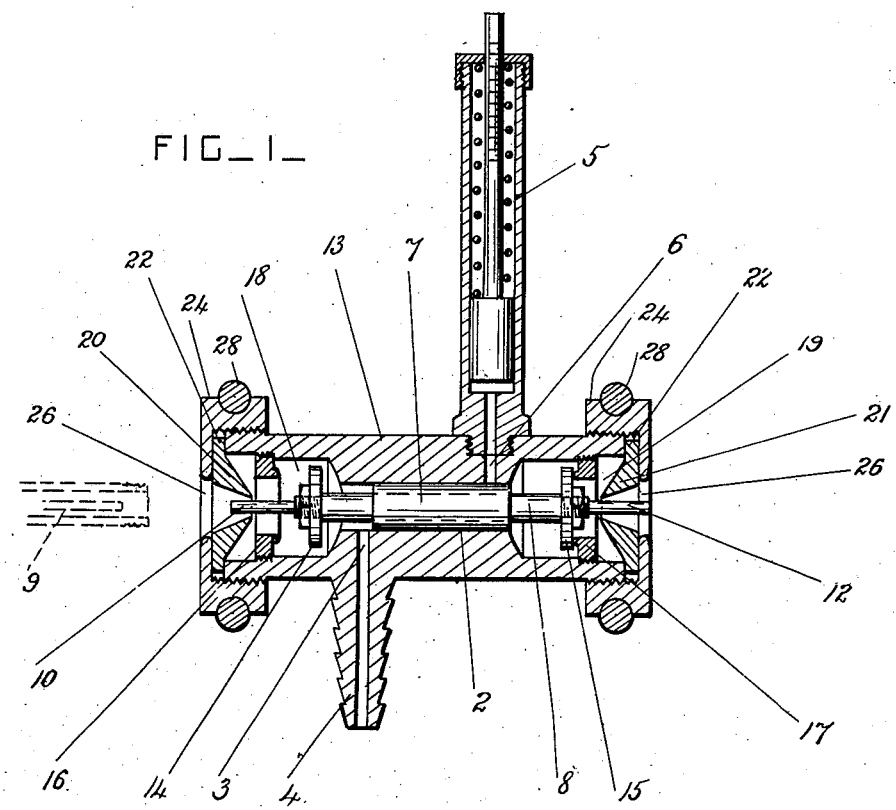
FIG_1_
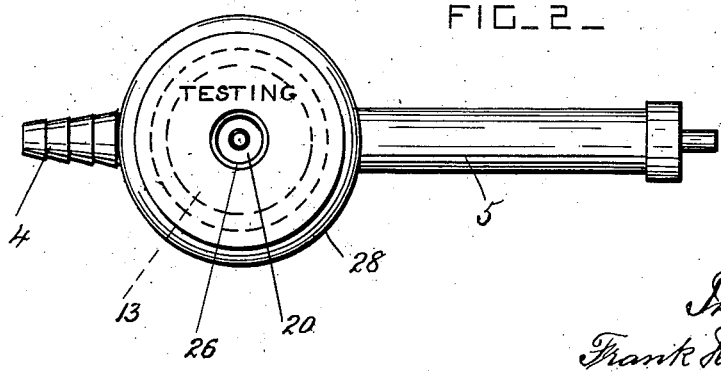
FIG_2_
Inventor
Frank H. Engstrom
by Herbert W. Jenner
Attorney

UNITED STATES PATENT OFFICE.

FRANK H. ENGSTROM, OF CAMBRIDGE SPRINGS, PENNSYLVANIA.

TIRE INFLATER AND TESTER.

1,198,205.　　Specification of Letters Patent.　　Patented Sept. 12, 1916.

Application filed July 3, 1916. Serial No. 107,300.

*To all whom it may concern:*

Be it known that I, FRANK H. ENGSTROM, a citizen of the United States, residing at Cambridge Springs, in the county of Crawford and State of Pennsylvania, have invented certain new and useful Improvements in Tire Inflaters and Testers; and I do hereby declare the following to be full, clear, and exact description of the invention, such as will enable others skilled in the art to which it appertains to make and use the same.

This invention relates to devices for inflating, and testing the air pressure in, the pneumatic tires of vehicle road wheels; and it consists of a reversible device provided with suitable valves and connections for the air supply pipe and the pressure gage, said device being adapted to open the usual check-valve on the tire, and being constructed as hereinafter fully described and claimed.

In the drawings, Figure 1 is a longitudinal section through a device constructed according to this invention. Fig. 2 is an end view of the same.

A small cylinder 2 is provided in a casing 13, and this cylinder has a port 3, and a branch or connection 4 on one side for the attachment of the rubber hose or inflating pipe of any approved form of air-pump or other means for supplying compressed air. The cylinder also has upon one side a pressure-gage 5 and a port 6 for connecting the pressure-gage with the cylinder. The pressure-gage shown is of the spring-pressed piston type, but any approved construction of pressure-gage may be used in carrying out this invention.

A piston 7 is slidable in the cylinder 2, and is adapted to cover and uncover the ports 3 and 6 alternately. This piston is formed of hard rubber, or any other suitable material, and it is secured upon a piston-rod 8. The end portions 10 and 12 of the piston-rod are smaller in diameter than its middle portion, and they form stems for opening the check-valve on the tire. The check-valve on the tire is of any approved make which can be opened by pushing it inwardly, and a portion of a check-valve is shown in dotted lines 9.

Two valves 14 and 15 are secured on the piston-rod at suitable distances from the ends of the piston, and 16 and 17 are valve-seats secured in the middle parts of chambers 18 and 19 formed in the casing 13 at the ends of the cylinder 2.

Packing-rings 20 and 21 are secured in the outer ends of the chambers 18 and 19, and are conical in shape and formed of india rubber or other similar material. The smaller ends of the conical packing-rings encircle the stems 10 and 12. The packing-rings have flanges 22 which are clamped against the ends of the casing 13 by similar caps 24, which are screwed over the end portions of the casing. Each cap has a central hole 26 large enough to pass over the tubular casing of the check-valve on the tire.

The tire is inflated by pressing the stem 10 against the stem of the check-valve on the tire, the packing-washer or ring slipping over the tubular casing of the check-valve and preventing the compressed air from leaking out. The stem 10 is pressed back by contact with the valve stem so that the piston 7 is retracted and it uncovers the port 3. The compressed air is admitted through the port 3, the supply being regulated by a valve of any approved construction on the air supply pipe or hose.

The pressure of the air in the tire is tested by reversing the device and pressing the stem 12 against the stem of the check-valve in a similar manner. This retracts the piston and places the pressure-gage 5 in communication with the tire through the port 6. The tire is first inflated and then tested, so that the device is normally left in a position in which the air supply valve 14 is closed, and the air does not escape if the valve on the compressed air supply pipe is opened.

The caps on the ends of the device are marked in some suitable way, such as by the words "Inflating" and "Testing" being stamped upon them, so that they may be distinguished from each other. The caps also preferably have rings 28 of soft material, such as india rubber, sprung into circumferential grooves. These rings 28 do not affect the action of the device, and they are provided to preserve it from injury when dropped accidentally on any hard surface.

What I claim is:

1. A reversible device for inflating and testing tires, comprising a casing provided at its middle part with means for connecting it with a pressure-gage and a compressed air supply, and having at its ends packing-rings adapted to engage with the casing of the check-valve on the tire, and valves working in the casing and having projecting stems for placing the said check-valve in communication with the said compressed air supply and pressure-gage alternately.

2. A reversible device for inflating and testing tires, comprising a casing provided with a cylinder having ports for communicating with a pressure-gage and a compressed air supply, a piston slidable in the said cylinder and closing the said ports alternately, said piston being provided at its ends with stems for operating it and for opening the check-valve on the tire, valve-seats secured in the end portions of the casing, valves secured on the said stems and adapted to close the said valve-seats alternately, and packing-rings secured to the ends of the casing and adapted to engage with the casing of the said check-valve.

3. In a device of the character described, a casing provided with a cylinder having a lateral air port, and having also a chamber at one end, a valve-seat secured in the said chamber, a piston slidable in the cylinder and controlling the said port, said piston having a stem which projects through the valve-seat and is adapted to retract the piston and to open the check-valve on the tire, a valve secured to the said stem and adapted to close the outlet through the said valve-seat, and a packing-ring secured to the outer end of the casing around the end of the said stem and adapted to engage with the casing of the said check-valve.

In testimony whereof I have affixed my signature.

FRANK H. ENGSTROM.